United States Patent [19]
Wilkens, Sr. et al.

[11] Patent Number: 5,149,117
[45] Date of Patent: Sep. 22, 1992

[54] UNIVERSAL TOY SAUCER

[76] Inventors: Doublas A. Wilkens, Sr., 1721 W. Pine St.; Ronald F. Ullrich, 1031 Mason St., both of Lodi, Calif. 95242

[21] Appl. No.: 756,999

[22] Filed: Sep. 9, 1991

[51] Int. Cl.⁵ .............................................. B62B 13/00
[52] U.S. Cl. ...................... 280/18.1; 280/30; 441/67; 472/118
[58] Field of Search ............ 280/30, 18.1, 14.1, 280/14.2, 14.3; 441/65, 67, 71; 114/253; 472/118

[56] References Cited

U.S. PATENT DOCUMENTS

| | | | |
|---|---|---|---|
| 1,712,703 | 5/1929 | Hudson | 280/18.1 |
| 3,123,374 | 3/1964 | MacLeod | 280/18.1 |
| 3,671,988 | 6/1972 | Newman | 441/65 |
| 3,674,260 | 7/1972 | Loseke | 280/18.1 |
| 3,901,526 | 8/1975 | Scott et al. | 280/18.1 |

FOREIGN PATENT DOCUMENTS 2040827  9/1980  United Kingdom ................ 441/67

Primary Examiner—Andres Kashnikow
Assistant Examiner—Richard Camby
Attorney, Agent, or Firm—Leon Gilden

[57] ABSTRACT

A saucer-shaped toy is designed to be utilized alternatively as a swing, a water slide and a snow slide. The saucer may be hung from a support when functioning as a swing, while it may be towed behind a boat when operable as a water slide. The saucer shape permits the toy to be used as a sled up on a snow covered surface, and removable runners can be employed to improve its steering capability over snow. When used as a water slide, a removable rudder can be used as well as water spray jets or enhanced aesthetic appeal. An upright steering pole can be attached to the saucer with a stiff spring so as to permit the pole to flexibly move to lessen the likelihood of injury to a user under certain situations.

4 Claims, 5 Drawing Sheets

PRIOR ART

UNIVERSAL TOY SAUCER

BACKGROUND OF THE INVENTION

1. Field of the Invention

The present invention relates to toys and more particularly pertains to a combination swing, water slide and snow coaster.

2. Description of the Prior Art

The use of saucer-shaped coaster toys is known in the prior art. For example, U.S. Pat. No. 3,123,374, which issued to J. Macleod on Mar. 3, 1964, discloses a snow coaster which is of a saucer-like shape and which utilizes a steering rudder assembly. Similarly, U.S. Pat. No. 3,901,526, which issued to Scott et al. on Aug. 26, 1975, discloses a saucer-like sled which employs the use of a steerable rudder. As can be appreciated, both of these typical prior art coasters are functional for their intended purposes; however, both are representative of devices which are limited with respect to the scope of usage.

More particularly, neither of these prior art coasters are well adapted for uses other than as sleds and in this respect, the saucer-like toy according to the present invention substantially departs from the conventional concepts and designs of the prior art. In so doing, the present invention provides an apparatus primarily developed for the purpose of a combinational use, i.e., it can be utilized alternatively as a swing, a water slide or a snow sled. Therefore, it can be appreciated that there exists a continuous need for new and improved toys of this nature and in this regard, the present invention substantially fulfills this need.

SUMMARY OF THE INVENTION

In view of the foregoing disadvantages inherent in the known types of toy sleds and coasters now present in the prior art, the present invention provides an improved toy coaster construction wherein the same can be utilized alternatively as a tree swing, a snow sled or a water slide. As such, the general purpose of the present invention, which will be described subsequently in greater detail, is to provide a new and improved toy coaster which has all the advantages of the prior art coasters and none of the disadvantages.

To attain this, the present invention essentially comprises a saucer-shaped toy which is designed to be utilized alternatively as a swing, a water slide and a snow slide. The saucer may be hung from a support when functioning as a swing and may be towed behind a boat when operable as a water slide. The saucer shape also permits the toy to be used as a sled on a snow covered surface, and removable runners can be employed to improve its steering capability over a snow covered surface. When used as a water slide, a removable rudder can be used as well as water spray jets for enhanced aesthetic appeal. An upright steering pole can be attached to the saucer with a stiff spring so as to permit the pole to flexibly move to lessen the likelihood of injury to a user under certain use situations.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved saucer-shaped coaster which has all the advantages of the prior art saucer-shaped coasters and none of the disadvantages.

It is another object of the present invention to provide a new and improved saucer-shaped coaster which may be easily and efficiently manufactured and marketed.

It is a further object of the present invention to provide a new and improved saucer-shaped coaster which is of a durable and reliable construction.

An even further object of the present invention is to provide a new and improved saucer-shaped coaster which is susceptible of a low cost of manufacture with regard to both materials and labor, and which accordingly is then susceptible of low prices of sale to the consuming public, thereby making such saucer-shaped coasters economically available to the buying public.

Still yet another object of the present invention is to provide a new and improved saucer-shaped coaster which provides in the apparatuses and methods of the prior art some of the advantages thereof, while simultaneously overcoming some of the disadvantages normally associated therewith.

Still another object of the present invention is to provide a new and improved saucer-shaped coaster which can be alternatively used as a tree swing, a snow sled or a water slide.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
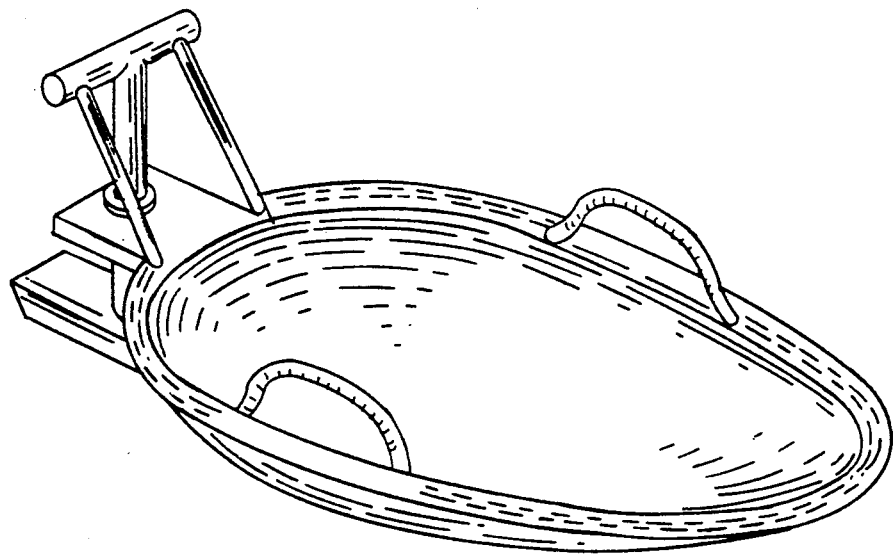
FIG. 1 is a perspective view of a prior art sled.

With reference now to the drawings, a new and improved universal toy saucer embodying the principals and concepts of the present invention and generally designated by the reference numeral 10 will be described.

Figure 2:
FIG. 2 is a perspective view of another prior art snow coaster.

To understand the improvements afforded by the present invention, initial reference is made to FIGS. 1 and 2 of the drawings wherein typical prior art toy saucers are illustrated. In this regard, FIG. 1 illustrates a sled as disclosed in U.S. Pat. No. 3,901,526 as aforementioned wherein this sled is of a saucer-like shape and is designed to be utilizable only on a surface covered with snow. While being functional for its intended use, it can be appreciated that such usage is limited in scope. Similarly, FIG. 2 illustrates a saucer-like coaster as particularly disclosed in U.S. Pat. No. 3,123,374 as was priorly discussed. This sled also makes use of a saucer-like construction; however, its use is limited to a snow covered surface and no alternative uses are discussed or even apparently envisioned. Both of these saucer-like toys are substantially illustrative of the current state of the art.

Figure 3:
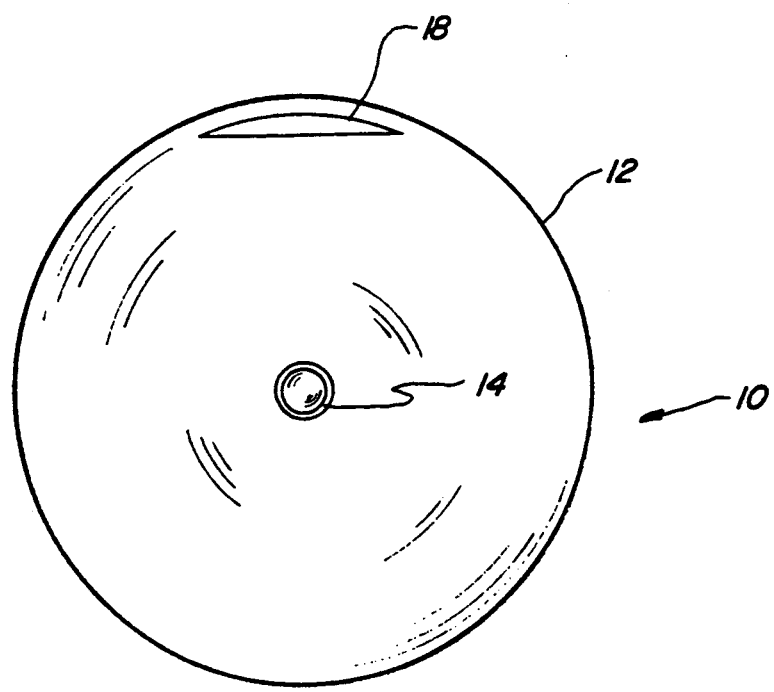
FIG. 3 is a top plan view of the universal saucer comprising the present invention.
Figure 4:
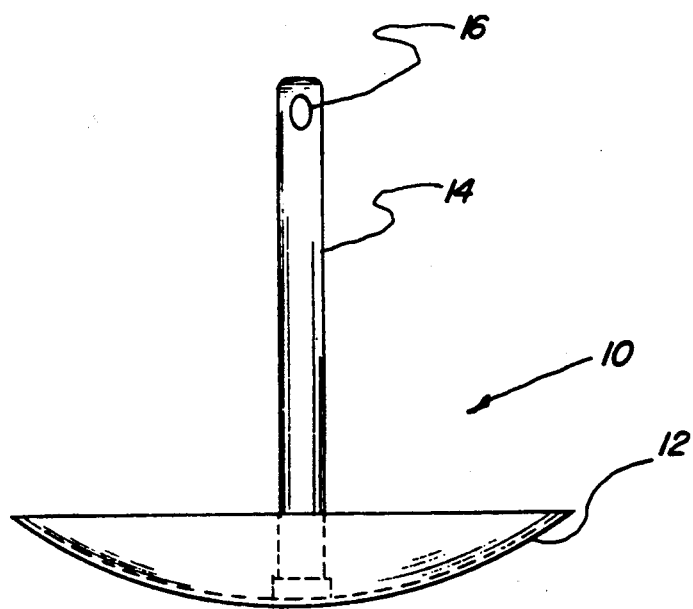
FIG. 4 is a side elevation view of the invention.

FIGS. 3 and 4 illustrate a first embodiment 10 of the present invention. In this regard, it will be noted that the universal saucer 10 essentially comprises a circular concavely-shaped saucer 12 having a rigidly attached, upstanding rod or pole 14 secured to a center portion thereof. The pole 14 is provided with a through-extending opening 16 on a topmost section thereof with this hole facilitating the attachment of a rope or the like. The unillustrated rope can then be attached to an overhead support so that the universal saucer 10 can be suspended from a ground surface, thereby facilitating its use as a swing. A slot 18 may be cut through a peripheral portion of the saucer 12 with this slot then functioning as a carrying handle whenever the invention 10 is transported from one location to another.

Figure 5:
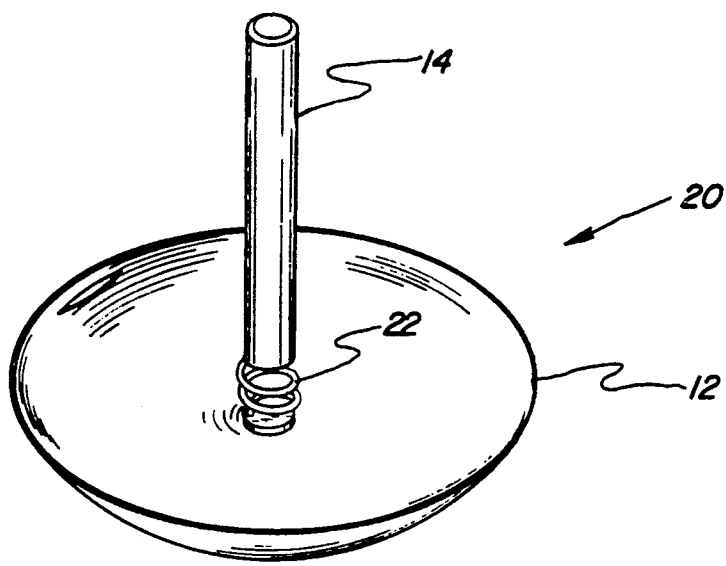
FIG. 5 is a perspective view of a second embodiment of the invention.

FIG. 5 of the drawings illustrates a modified embodiment of the invention 10 wherein such modified embodiment is generally designated by the reference numeral 20. As shown, the embodiment 20 includes the same saucer 12 to which is attached an upright pole 14. Recognizing that the embodiment 20 can be utilized as either a snow sled or a water slide, there exists some risk that a child or other user could be injured by contact with the pole 14. While the pole 14 can be used to effectively assist in the steering of the coaster 20, complete rigidity may not be desirable. As such, a substantially stiff coil spring 22 may be utilized as the means of connecting the pole 14 to the center portion of the saucer 12. This still provides the user with the ability to steer the saucer 12 by manipulating the upstanding pole 14, while the pole will also flexibly move relative to the saucer 12 in the event of a rapid halting of the coaster 20 as might be caused by a collision or the like. This relative movement of the pole 14 with respect to the saucer 12 could prevent a user from becoming impaled or otherwise injured by the pole.

Figure 9:
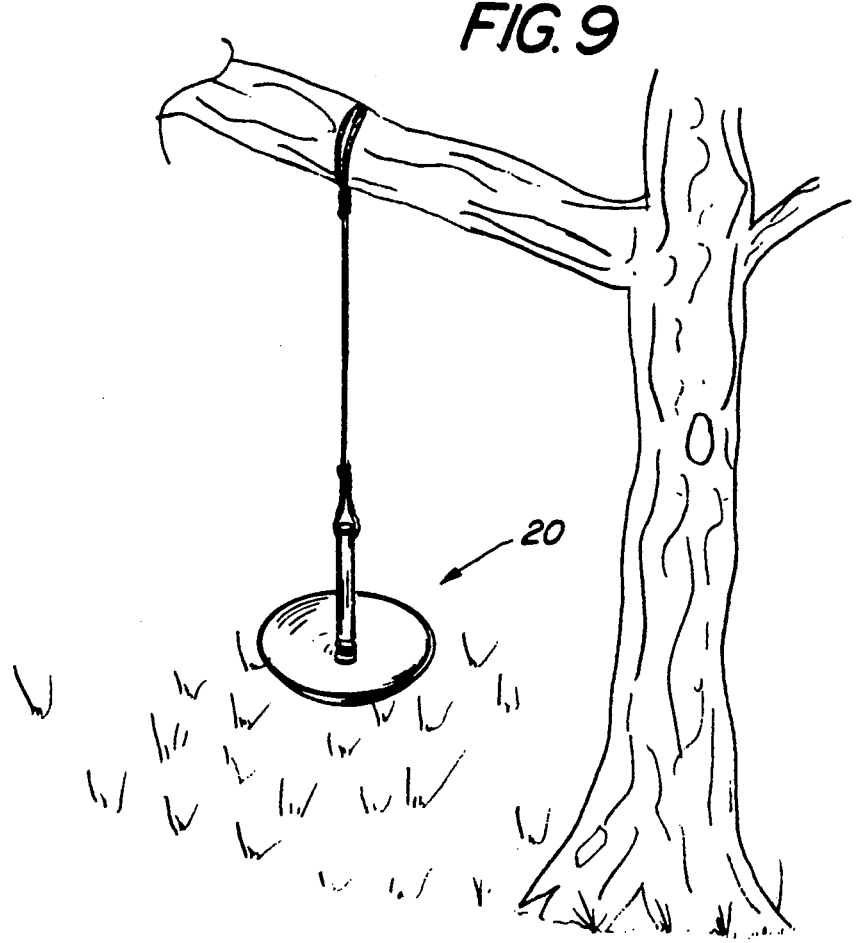
FIG. 9 is a perspective view of the invention illustrating one intended use thereof.

As shown in FIG. 9, the saucer 20 can still be utilized as a swing from a tree when the pole 14 is attached to the saucer 12 by means of the spring 22. In this connection, a user can sit within the concave shape of the saucer 12 while swinging and the to-and-fro movement of the toy 20 can be supplemented by an up and down movement afforded by the spring 22.

Figure 6:
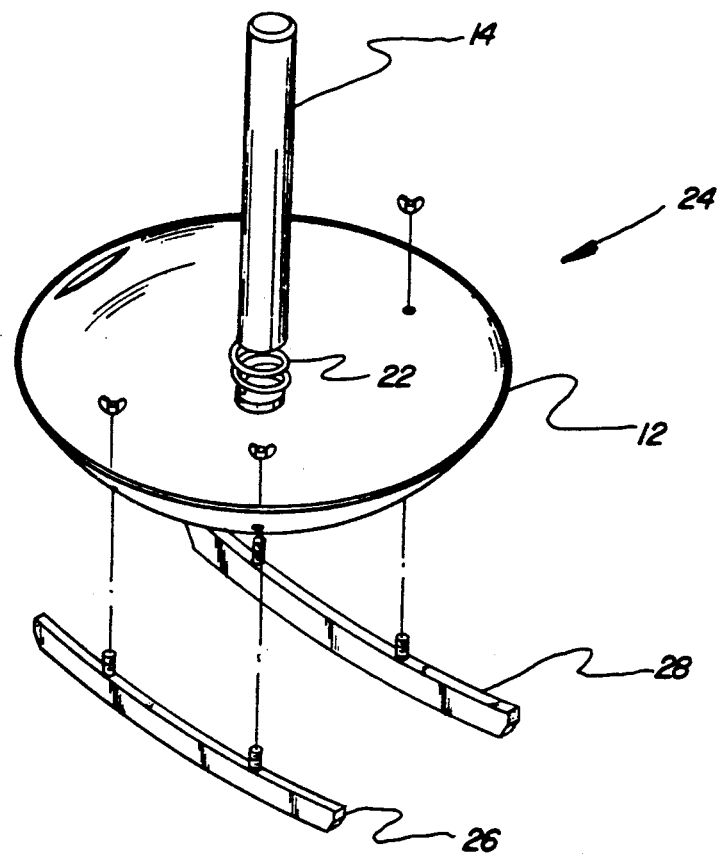
FIG. 6 is a perspective view of another embodiment of the invention.

FIG. 6 of the drawings illustrates a further embodiment of the invention which is generally designated by the reference numeral 24. In this further embodiment 24, a pair of runners 26, 28 may be removably attached in a parallel relationship to a bottom portion of the saucer 12. Any conventional means of attaching the runners 26, 28 to the saucer 12 may be employed and in the present case, threaded fasteners are utilized to accomplish the connection of the runners to the saucer. This modification allows the universal saucer 24 to more reliably function as a snow sled and as is apparent, the runners 26, 28 can be removed if desired when the saucer is utilized for other purposes.

Figure 7:
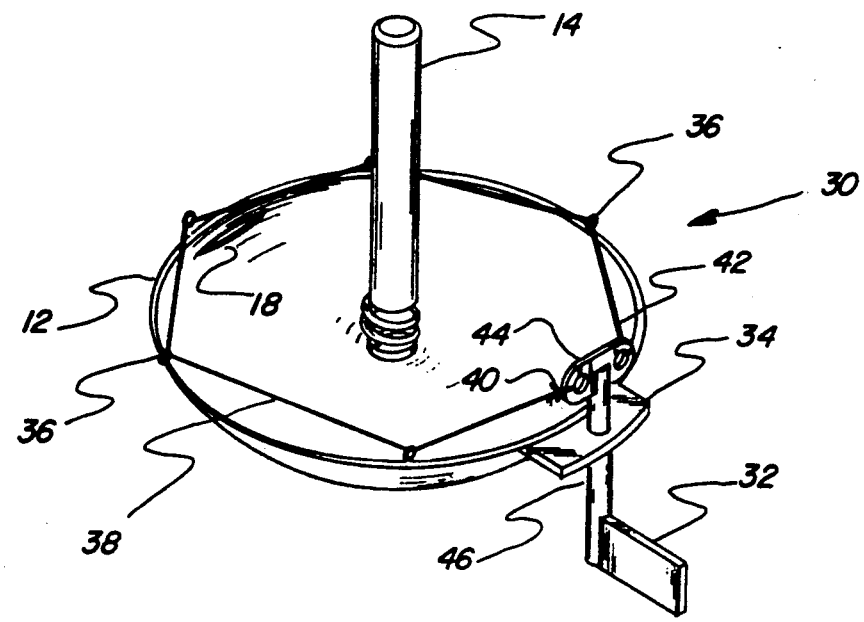
FIG. 7 is a perspective view of a further embodiment of the invention.

FIG. 7 illustrates a further embodiment of the invention which is generally designated by the reference numeral 30 with this embodiment being particularly adapted for use as a water slide. A rudder 32 is rotatably mounted through a support post 34 which is fixedly secured to a peripheral edge of the saucer 12. A plurality of upstanding eyes 36 are mounted about the peripheral edge of the saucer 12 and a cord 38 is directed through each of the eyes. The remote ends 40, 42 of the cord 38 are attached to a key member 44 which is fixedly secured to the rudder shaft 46. A user sitting within the saucer body 12 can manipulate the cord 38 to effectively rotate the rudder 32 in either direction. When the saucer 30 is being utilized as a water slide, a tow rope can be attached through the carrying handle slot 18 and the user can then hold onto the pole 14 with his hands while utilizing his feet to manipulate the rudder cord 38. This facilitates a controlled movement of the saucer 30 over the surface of the water while it is attached to a towing vehicle such as a boat or the like.

Figure 8:
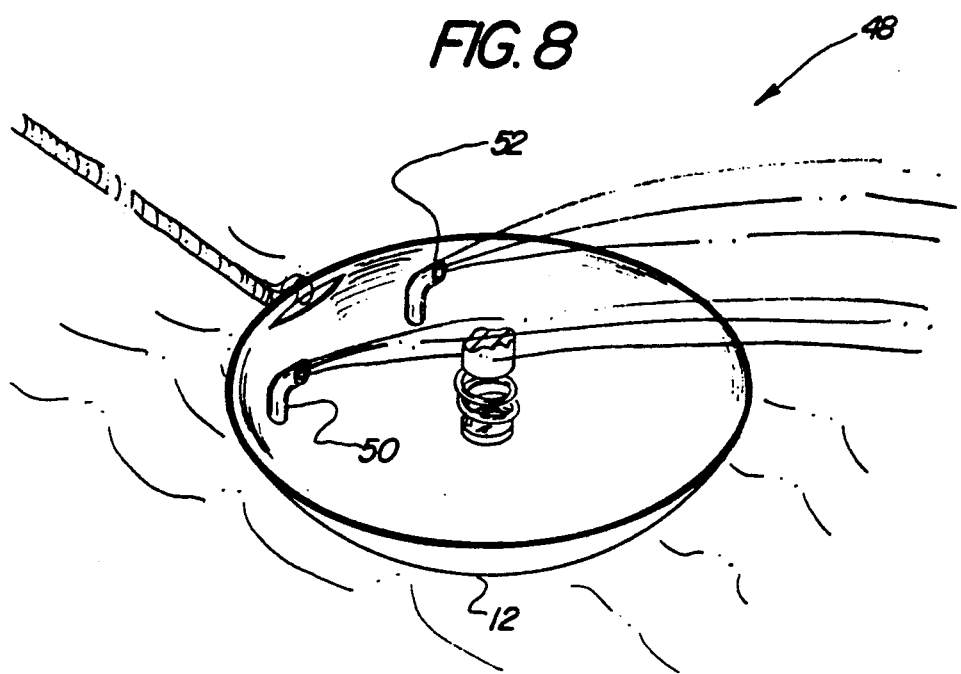
FIG. 8 is a perspective view of even another embodiment of the invention.

FIG. 8 of the drawings illustrates a further embodiment of the invention which is generally designated by the reference numeral 48. In this embodiment, the saucer body 12 is provided with a pair of upstanding conduits 50, 52 which are fixedly secured to through-extending apertures within the saucer body. When the saucer 48 is towed across the surface of the water, some water is directed upwardly through the conduits 50, 52 so as to provide a "rooster tail" spray affect for aesthetic enjoyment.

Figure 10:
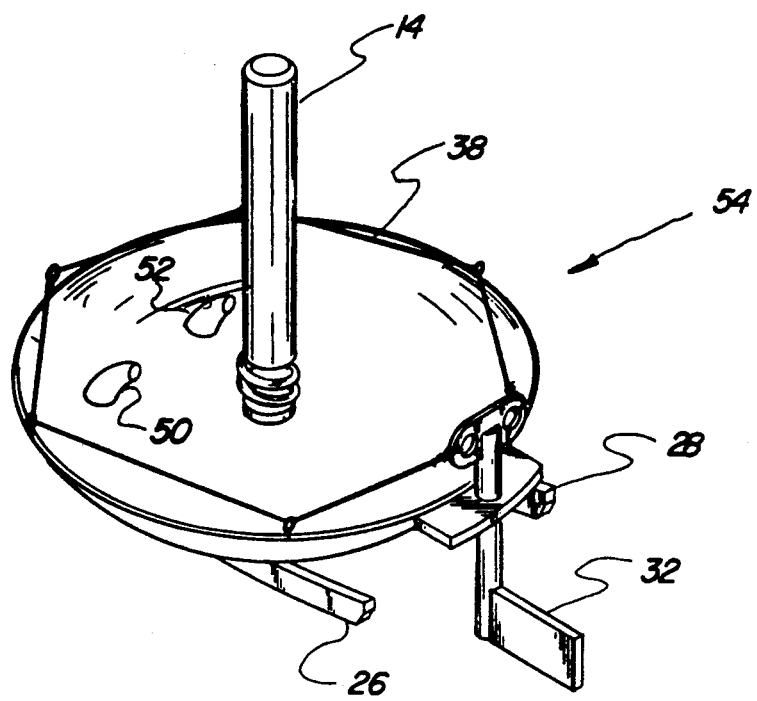
FIG. 10 is a perspective view of a further embodiment of the invention.

A final embodiment of the invention is illustrated in FIG. 10 of the drawings and is generally designated by the reference numeral 54. As is apparent from reviewing FIG. 10, this embodiment of the invention illustrates a combined construction wherein the runners 26, 28, the rudder assembly 32 along with its control cord 38, and the water spray jets 50, 52 are all included in a single embodiment of the invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved universal saucer toy which can be used alternatively as a flexibly supported swing, a snow sled and a water slide, said toy comprising:
   a user supporting, concavely-shaped saucer body;
   an upright support pole fixely secured to a central portion of said saucer body;
   a through-extending aperture in a topmost portion of said support pole, said aperture being designed to receive a cord to facilitate a use of said toy as a swing when said cord is attached to an overhead support;
   a through-extending slot in a peripheral edge of said saucer body, said slot functioning as a carrying handle and also a cord attachment means when said toy is being towed across a body of water whereby said toy is functioning as a waterslide;
   and
   a spring means interconnected between said support pole and said saucer body, said spring means facilitating relative movement between said support pole and said saucer body.

2. The new and improved universal saucer toy which can be used alternatively as a flexibly supported swing, a snow sled and a water slide as described in claim 1, and further including a pair of sled runners removably attachable to a bottom surface of said saucer body.

3. The new and improved universal saucer toy which can be used alternatively as a flexibly supported swing, a snow sled and a water slide as described in claim 1, and further including a removable rudder assembly fixedly securable to said saucer body.

4. The new and improved universal saucer toy which can be used alternatively as a flexibly supported swing, a snow sled and a water slide as described in claim 1, and further including at least one water spray delivery conduit fixedly securable to a through-extending aperture formed in said saucer body.

* * * * *

UNITED STATES PATENT AND TRADEMARK OFFICE
CERTIFICATE OF CORRECTION

PATENT NO. : 5,149,117

DATED : September 22, 1992

INVENTOR(S) : Douglas A. Wilkins, Sr.

It is certified that error appears in the above-identified patent and that said Letters Patent is hereby corrected as shown below:

Title Page:
   Item [19] "Wilkens" should be --Wilkins--; and
      [76] first inventors name should read as
         --Douglas A. Wilkins, Sr.--.

Signed and Sealed this

Fifth Day of January, 1993

*Attest:*

DOUGLAS B. COMER

*Attesting Officer*     *Acting Commissioner of Patents and Trademarks*